United States Patent

[11] 3,612,754

[72] Inventor Robert Dale Altmanshofer
Indianapolis, Ind.

[21] Appl. No. 36,056
[22] Filed May 11, 1970
[45] Patented Oct. 12, 1971
[73] Assignee RCA Corporation

[54] COLOR TEMPERATURE CONTROL CIRCUITS
10 Claims, 1 Drawing Fig.

[52] U.S. Cl. .... 178/5.4 R
[51] Int. Cl. .... H04n 9/18
[50] Field of Search .... 178/5.4, 5.4 AC, 5.4 SD, 5.4 CK

[56] References Cited

UNITED STATES PATENTS

| | | | |
|---|---|---|---|
| 3,324,236 | 6/1967 | Detch et al. .... | 178/5.4 |
| 2,954,426 | 9/1960 | Kroger .... | 178/5.4 |
| 3,457,362 | 8/1969 | Mackey et al. .... | 178/5.4 |

*Primary Examiner*—Robert L. Griffin
*Assistant Examiner*—Richard P. Lange
*Attorney*—Eugene M. Whitacre

ABSTRACT: A color temperature control circuit operates between a monochrome and color transmission to alter the background tint of the display by injecting a suitable pulse via a diode which is rendered conductive or nonconductive by means of the color killer circuit included in the receiver. The injected pulse as applied to DC restoring circuits serves to affect the level at which the control electrodes of the kinescope are biased.

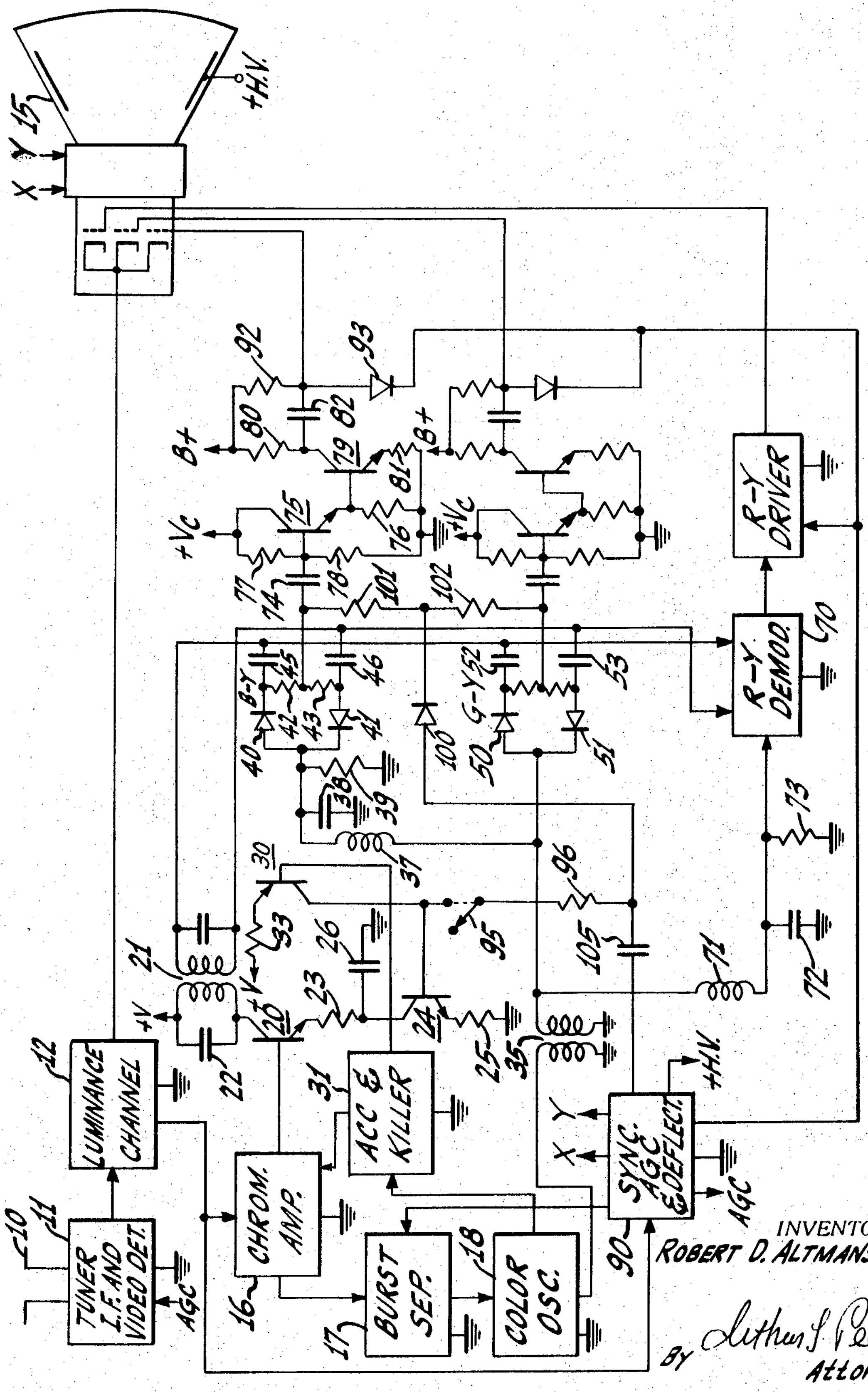
INVENTOR.
ROBERT D. ALTMANSHOFER
BY Arthur L. Peery
Attorney

COLOR TEMPERATURE CONTROL CIRCUITS

This invention relates to color television receivers and more particularly to color temperature control circuitry for use therein.

It has been found that the most pleasing presentation of color images and for black and white images occur at different color temperatures. The optimum color temperature for viewing black and white images is about 9,300° K., whereas the optimum color temperature for viewing color images is about 6,800° K. Many manufacturers have included color temperature switches in their receivers which may be operated automatically via the color killer circuit to shift the color temperature of the kinescope depending on whether a color or a monochrome signal is being received.

Many of these techniques utilize relatively complicated circuitry to afford automatic color temperature switching.

It is an object of the present invention to provide improved and simplified color temperature switching circuitry for use in a color television receiver.

A color television receiver embodying the invention includes a DC restoring circuit for establishing an operating bias at the kinescope control electrodes during the horizontal retrace interval. This biasing determines the color temperature at which the kinescope operates. Color killer means in the receiver is responsive to television transmissions to provide at an output thereof a first level indicative of a color transmission and a second level indicative of a monochrome transmission. A unidirectional current conductive device is coupled between the color killer circuit means and the DC restoring circuit. The color killer circuit biases said device to operate in a conductive mode for the first level and reverse biases the device for the second level. Means are coupled to the diode for applying pulses thereto occurring during the horizontal retrace interval. During color reception the pulses through said device serve to alter the bias established by the DC restoring means to thereby affect the color temperature of the kinescope display.

These and other objects of the present invention are more fully described with reference to the following specification when read in conjunction with the sole FIGURE, which is a schematic diagram partially in block form of a color television receiver employing color temperature control circuitry according to this invention.

A television antenna 10, which is responsive to a transmitted television signal is coupled to the input of a tuner, intermediate frequency amplifier (IF) and video detector section 11. Section 11 supplies a video signal to a luminance channel 12 for application thereto to suitable electrodes of the kinescope 15, which may be a three-gun shadow mask device. As is common, the luminance channel provides direct coupling from the video detector to the kinescope cathodes. The luminance channel is also coupled to the sync, AGC and deflection circuits 90.

An amplified version of the luminance signal from channel 12 is also coupled to a chrominance amplifier 16. The output terminal of the chrominance amplifier 16 is coupled to a burst separator circuit 17. Burst separator 17 is keyed on during that portion of the horizontal interval containing the color burst signal. The burst separator 17 is coupled to a color oscillator 18, which provides a continuous wave output signal synchronized to the transmitted burst.

The chrominance amplifier 16 is also coupled to the base electrode of a transistor 20 arranged in a common emitter configuration and having a collector electrode coupled to a source of operating potential +V via the primary winding of a bandpass transformer 21. The primary winding of transformer 21 is tuned to the color subcarrier frequency by a capacitor 22. The emitter electrode of transistor 20 is returned to ground through a resistor 23, the collector to emitter path of a color killer transistor 24, and a resistor 25. The junction between the resistor 23 and the collector electrode of transistor 24 is bypassed to ground for chrominance signal frequencies by a capacitor 26.

The base electrode of transistor 24 is coupled to the collector electrode of transistor 30 which is controlled by an ACC and color killer module 31. The function of the ACC and color killer module 31 is (1 ) to provide a DC voltage representative of the amplitude of the color burst to control the gain of the chrominance channel and (2) to provide a control voltage indicative of the presence or absence of a color transmission. The emitter electrode of transistor 30 is returned to the source of operating potential +V via resistor 33.

The output of the color oscillator 18 is applied via a transformer 35 to the inputs of the three demodulators for obtaining three color difference signals, namely, the B-Y, G-Y, and R-Y. Accordingly, the secondary winding of transformer 35 is coupled to the B-Y demodulator via a first phase shifting network including inductor 37, capacitor 38, and resistor 39 to the junction between the anode of diode 40 and the cathode of diode 41. The opposite electrodes of diodes 40 and 41 are coupled together through the series resistors 42 and 43. Chrominance signals to be demodulated are applied through capacitors 45 and 46 to the cathode of diode 40 and to the anode of diode 41.

The G-Y demodulator includes diodes 50 and 51 arranged as described above and receiving color oscillator signal at a different phase via the connection between the anode of diode 50 and the cathode of diode 51 to the secondary winding of transformer 35. The chrominance signal is applied thereto by coupling the opposite electrodes of diodes 50 and 51 to the secondary winding of transformer 21 via the capacitors 52 and 53. For the sake of convenience and simplicity, the R-Y demodulator 70 which may be identical to those shown above, is depicted in block form and receives a third phase of color reference signal from the secondary winding of transformer 35 by the action of the phase shifting network including inductor 71, capacitor 72, and resistor 73. In a similar manner the chrominance signals are applied to the R-Y demodulator 70 from the secondary winding of transformer 21.

The B-Y signal derived at the junction between resistors 42 and 43 is coupled via capacitor 74 to the base electrode of an emitter follower amplifier including transistor 75. Transistor 75 has a collector electrode coupled to the +VC source and an emitter electrode coupled to ground via a load resistor 76. A pair of resistors 77 and 78 coupled between the +V supply and point of operating potential provide base bias for the transistor 75.

The emitter electrode of transistor 75 is coupled to the base electrode of a driver transistor 79 arranged in a common emitter configuration. Transistor 79 has a load resistor 80 coupled between the collector electrode and a source of higher operating potential designated as B+ and selected to provide an optimum voltage swing for the grid electrodes of the kinescope. The emitter electrode of transistor 79 is returned to the point of reference potential via a self-biasing resistor 81. The collector electrode, having a large amplitude chrominance signal available thereat, is coupled to the suitable grid (i.e., blue grid) of the kinescope via a capacitor 82. In a similar manner the G-Y demodulator and the R-Y demodulator 70 are coupled to the respective grids of the kinescope 15 via identical driver circuits as shown for the B-Y demodulator.

A DC restoring technique is used to establish a proper operating bias for the kinescope grids, which must be held at a compatible DC level with respect to the cathodes. The level at the cathodes and therefore the grids may be at a relatively high DC voltage. A capacitor 82, which is coupled between the collector electrode of transistor 79 and the "blue" grid of the kinescope 15, has coupled to the grid connected terminal thereof a resistor 92 whose other terminal is connected to the B+ supply. The junction between resistor 92 and capacitor 82 is connected to the anode of a diode 93. The cathode of diode 93 is coupled to the sync, AGC and deflection circuitry 90. In a similar manner each of the other two grids, as the red and green, have identical clamp circuits associated therewith.

Briefly, the clamping circuits function during the retrace interval of the television signal at which time the diodes as 93 receive negative pulse which causes them to conduct. The capacitors, as 82, are charged during this interval to a level determined by the amplitude of the pulse to maintain the charge across the capacitor 82 at a predetermined level during the scan time. The charge across this capacitor 82, together with the DC voltage at the cathodes, determines the effective grid to cathode bias of the kinescope and hence the operating point. As indicated, this charge is restored during each horizontal interval to maintain that bias relatively constant. It is this bias between each grid and cathode of the three-gun kinescope which determines the effective color temperature of the display. As previously indicated, the kinescope biases are adjusted to impart to the display a color temperature which is equivalent to approximately 9,300° K. This color temperature can be varied according to the embodiments of this invention as follows.

Connected to the base electrode of the killer transistor 24 is a single-pole, double-throw switch 95. The common contact of switch 95 is connected through a resistor 96 to the anode of a diode 100 having its cathode connected respectively through resistors 101 and 102 to the base coupling capacitors, as capacitor 74, of the emitter follower drivers, as driver 75. When the switch is in the position shown corresponding to the "off" position, the color temperature of the kinescope is set at 9,300° K. for both black and white and color reception. It is noted that the junction between the anode of diode 100 and the resistor 96 is also coupled to the same AGC and deflection circuitry 90 via a capacitor 105. The circuitry 90 supplies a negative pulse at the horizontal deflection rate through the capacitor 105 to the anode of diode 100. With the switch in the position as shown, the diode 100 is cut off and blocks the pulse.

With the switch 95 closed (in the dashed line position), the diode is biased off during monochrome reception and into conduction during color reception. During monochrome reception, the color killer circuit causes the collector electrode of transistor 30 to operate at ground or at 0 volts. The diode 100 is reversed biased and therefore the amplitude of the negative horizontal retrace pulse applied through the diode 100 to the B-Y and G-Y output driver stages is negligible. In essence, this operation is similar to that obtained for the open position of the switch. Therefore, during a monochrome transmission the color temperature is 9,300° K. as determined primarily by the direct voltage applied to the kinescope cathodes and the magnitude of the horizontal pulses applied to the DC restorer diodes such as diode 93.

With switch 95 closed and during the reception of color transmissions, the base electrode of transistor 24 is positive. This positive voltage at the base of transistor 24 or at the collector electrode of transistor 30 serves to forward bias diode 100. Therefore, the horizontal r.e.p. rate pulses from the circuitry 90 are applied through capacitor 105 and diode 100 to the base electrodes of the transistor 75 and its counterpart in the G-Y circuit. These pulses are inverted in polarity by the transistor 79 and its counterpart in the G-Y circuit and appear as a positive pulse at the anodes of the clamp diodes. The horizontal pulses translated through the color difference amplifiers occur simultaneously and combine with the clamp pulse being applied to the cathodes of diodes, as 93. The net result is to shift the voltage across capacitor 82, and its counterpart for the G-Y stage, in a more negative direction. This serves to change the bias on the blue and green guns of the kinescope more towards cutoff, which action effectively serves to lower the color temperature.

As described above, this condition representative of the lower color temperature can only occur with the switch 95 closed and during a color transmission. The switch 95 may be a customer controlled switch to enable him to operate at the lower color temperature during a color transmission to afford a better presentation of distorted flesh tone.

However, it can be seen that, if the switch 95 were eliminated and resistor 96 permanently connected to the base electrode of transistor 24, the operation described above would occur automatically between monochrome and black and white, thus setting up the kinescope color temperature at the two different levels described above. Circuitry described herein utilizes a few inexpensive components to obtain color temperature switching, which components because of the isolation afforded by diode 100 do not serve to affect the operating characteristics of the driver amplifiers or other receiver circuitry.

What is claimed is:

1. Apparatus for use in a television receiver including a color kinescope, said kinescope having a plurality of input electrodes for controlling the color content of the scene displayed by said kinescope according to the biasing of said electrodes and to color information present in a transmitted video signal during a color transmission and applied thereto, comprising, a. a first and second color information processing channel, having first and second outputs respectively, for providing during a color transmission a first signal representative of first color information at said output of said first channel and a second signal representative of second color information at said output of said second channel, b. a first capacitor for AC coupling said output of said first channel to a first one of said input electrodes, c. a second capacitor for AC coupling said output of said second channel to a second different one of said input electrodes, d. first means coupled to said first and second capacitors for charging each capacitor during regularly recurring intervals, said charging means establishing the quiescent biases at said first and second electrodes of said kinescope with a predetermined relationship therebetween, e. color killer means for providing at an output thereof a first DC level during a color transmission and a second DC level during a monochrome transmission, f. switching means coupled between said output of said color killer means and said first and second color information processing channels, responsive to said first level for providing a low impedance path therebetween, and for providing a high impedance path during said second level, g. means coupled to said switching means for applying a pulse of a selected magnitude and polarity and occurring during said regularly recurring interval to alter the relationship between the respective quiescent levels at said first and second outputs between a color and a monochrome transmission.

2. The apparatus according to claim 1 wherein said switching means includes a diode device having first and second terminals, coupled between said color killer means and said first and second color information processing channels.

3. The apparatus according to claim 1 wherein said recurring interval is the horizontal retrace interval associated with each television line.

4. The apparatus according to claim 1 wherein the respective signals provided at the outputs of said first and second color processing channels are the B-Y and G-Y color difference signals.

5. In a color television receiver, including a chrominance channel, said chrominance channel including means responsive to bursts of a color subcarrier present in a received television signal, to develop an oscillatory signal locked to said bursts, said chrominance channel including demodulator circuits, responsive to said oscillatory signal and chrominance information present in said received television signal for developing demodulated signals therefrom for application to the proper electrodes of a kinescope, first means including a capacitor coupling said demodulator to said kinescope electrode, and means coupled to said first means for restoring DC to said demodulated signal prior to the application thereof to said kinescope electrode during a fixed and predetermined interval associated with each television line, in combination therewith apparatus for altering the level of said DC between a monochrome and a color transmission comprising, a. color killer means responsive to a television transmission to provide at an output thereof a first level indicative of a color transmission and a second level indicative of a monochrome transmission, b. a unidirectional current conductive device having first and second terminals and having said first terminal coupled to said first means and said second terminal coupled to said color killer means for operating said device in a conducting mode for said first level and reverse biasing said device for said second level, c. means coupled to said first terminal of said unidirectional device for applying a signal thereto occurring during said fixed and predetermined interval whereby said signal is applied to said first means when said device is forward biased to alter the level at which said DC restoring takes place.

6. Apparatus for use in a color television receiver comprising, a. a source of composite video signals containing a modulated color subcarrier component and oscillatory bursts of a color subcarrier of a reference phase occurring during a predetermined interval, b. first means coupled to said source for extracting said modulated color subcarrier component therefrom, c. second means coupled to said source responsive to said bursts and providing an output signal locked to said bursts, d. third means responsive to said extracted modulated subcarrier component and said locked output signal for providing a demodulated signal representing color information, e. a color kinescope having at least one color control electrode, f. fourth means including a capacitor for AC coupling said third means to said color control electrode, g. DC restoring means coupled between a point of reference potential and the junction formed by said capacitor and said kinescope electrode, and operating during said predetermined interval to determine the bias at said control electrode, h. color killer means responsive to said color transmission to provide at an output thereof a first DC level indicative of the same, and a second DC level indicative of a monochrome transmission, i. switching means coupled between said color killer means and said fourth means responsive to said first DC level for providing a low impedance path therebetween, j. pulse injecting means coupled to said switching means for altering said bias during said predetermined interval at said kinescope electrode between a monochrome and a color transmission in accordance with said first and second DC levels as affecting said switching means.

7. Apparatus for shifting the color temperature of a kinescope display between a monochrome and a color transmission, said kinescope having a plurality of control electrodes which when biased determine the color temperature of said display, comprising, a. source of video signals for providing a composite video signal including chrominance components and an oscillatory burst color subcarrier signal occurring during a predetermined interval during a color transmission, b. color killer means responsive to said burst to provide a first DC level representative of a color transmission and a second DC representative of a monochrome transmission, c. means responsive to said composite video signal for extracting said burst information therefrom, d. means responsive to said composite video signal for extracting said chrominance components therefrom, e. first and second demodulators having an input responsive to said extracted chrominance components and a second separate input responsive to the phase and frequency of said extracted burst signal for providing at an output thereof first and second signals representative of first and second color information, f. a plurality amplifying means each having an input terminal and an output terminal, said output terminal including a separate capacitor coupling one output of each of said amplifying means to a separate control electrode of said kinescope, g. DC restoring means coupled to said capacitors for restoring the charge thereon during said predetermined interval to operate said kinescope display at a given color temperature, h. switching means coupled between said color killer means and said amplifying means input terminal, said switching means responsive to said first DC level for providing a low impedance path therebetween during said color transmission, i. pulse injecting means coupled to said switching means and occurring during said predetermined interval for applying a pulse to said amplifier to affect the level at which said DC restoring takes place during a color transmission as compared to that level during a monochrome transmission whereby the color temperature is shifted from said given color temperature.

8. The apparatus according to claim 7 wherein said switching means includes a diode device having an anode coupled to said color killer circuit means and a cathode coupled to said input of said amplifier means.

9. The apparatus according to claim 7 wherein said first and second demodulators are double diode demodulators.

10. The apparatus according to claim 7 further including, a. a selectively operated switch coupling said color killer means to said switching means to enable said color temperature shift operation during a first position and to render the same inoperative during a second position.